United States Patent [19]

Langkau

[11] 3,891,462
[45] June 24, 1975

[54] GALVANIC CELL STRUCTURE

[75] Inventor: John Frank Langkau, Lakewood, Ohio

[73] Assignee: Union Carbide Corporation, New York, N.Y.

[22] Filed: Oct. 29, 1973

[21] Appl. No.: 410,883

[52] U.S. Cl. ............................ 136/111; 136/166
[51] Int. Cl. .................................. H01m 1/00
[58] Field of Search .................. 136/111, 108–110, 136/107, 133, 134, 135, 163, 166, 167, 169–170, 173, 175; 220/68

[56] References Cited
UNITED STATES PATENTS

| 2,458,878 | 1/1949 | Ruben | 136/107 |
| 2,536,698 | 1/1951 | Ruben | 136/111 |
| 2,608,595 | 8/1952 | Conklin | 136/107 |
| 2,636,062 | 4/1953 | Colton | 136/133 |
| 2,740,823 | 4/1956 | Sexe et al. | 136/133 |
| 2,886,623 | 5/1959 | Lehr | 136/173 |
| 3,418,172 | 12/1968 | Fletcher | 136/111 |
| 3,615,867 | 10/1971 | Cich et al. | 136/175 |
| 3,676,221 | 7/1972 | Bach | 136/111 |
| 3,712,836 | 1/1973 | Bro et al. | 136/166 |

*Primary Examiner*—Anthony Skapars
*Attorney, Agent, or Firm*—C. F. O'Brien

[57] ABSTRACT

A galvanic cell structure comprising a sealed button cell, preferably an alkaline button cell, encased in a sealed metallic outer housing having a container and cover in the form and size of, and with the electrical terminals of, a larger sized button cell.

14 Claims, 9 Drawing Figures

PATENTED JUN 24 1975 3,891,462
SHEET 1
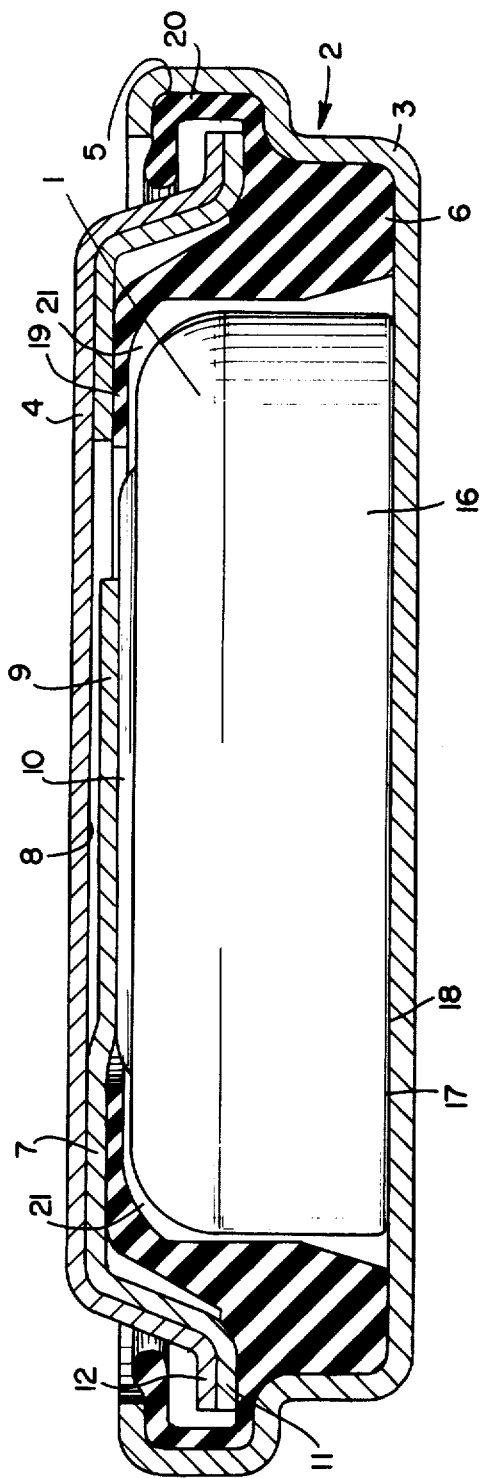
F I G. 1
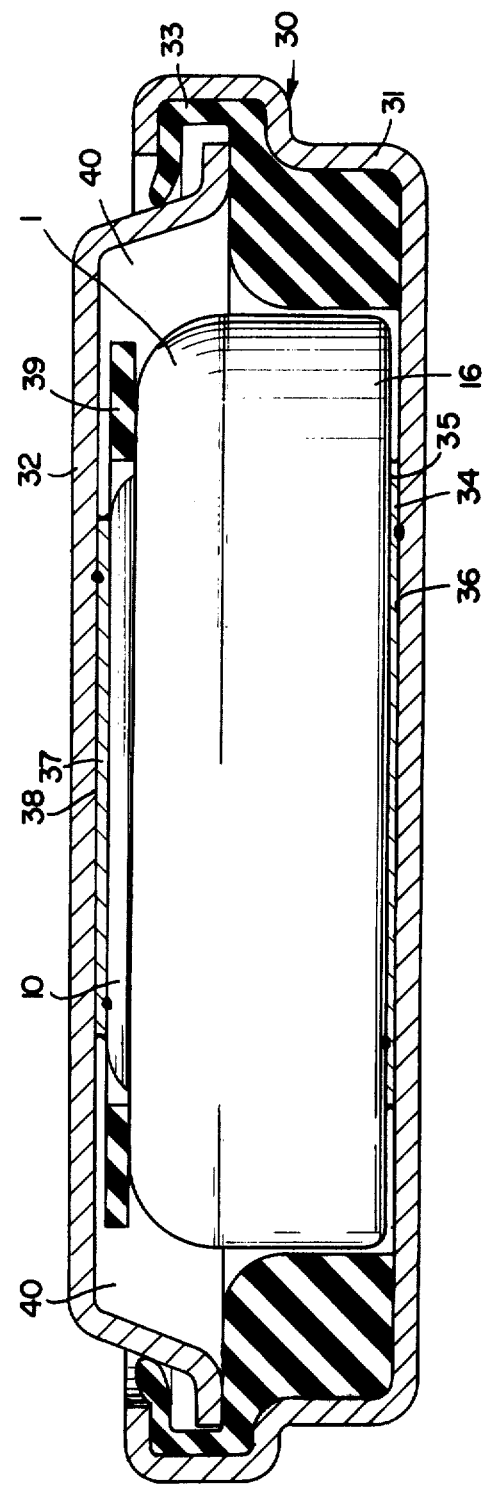
F I G. 2

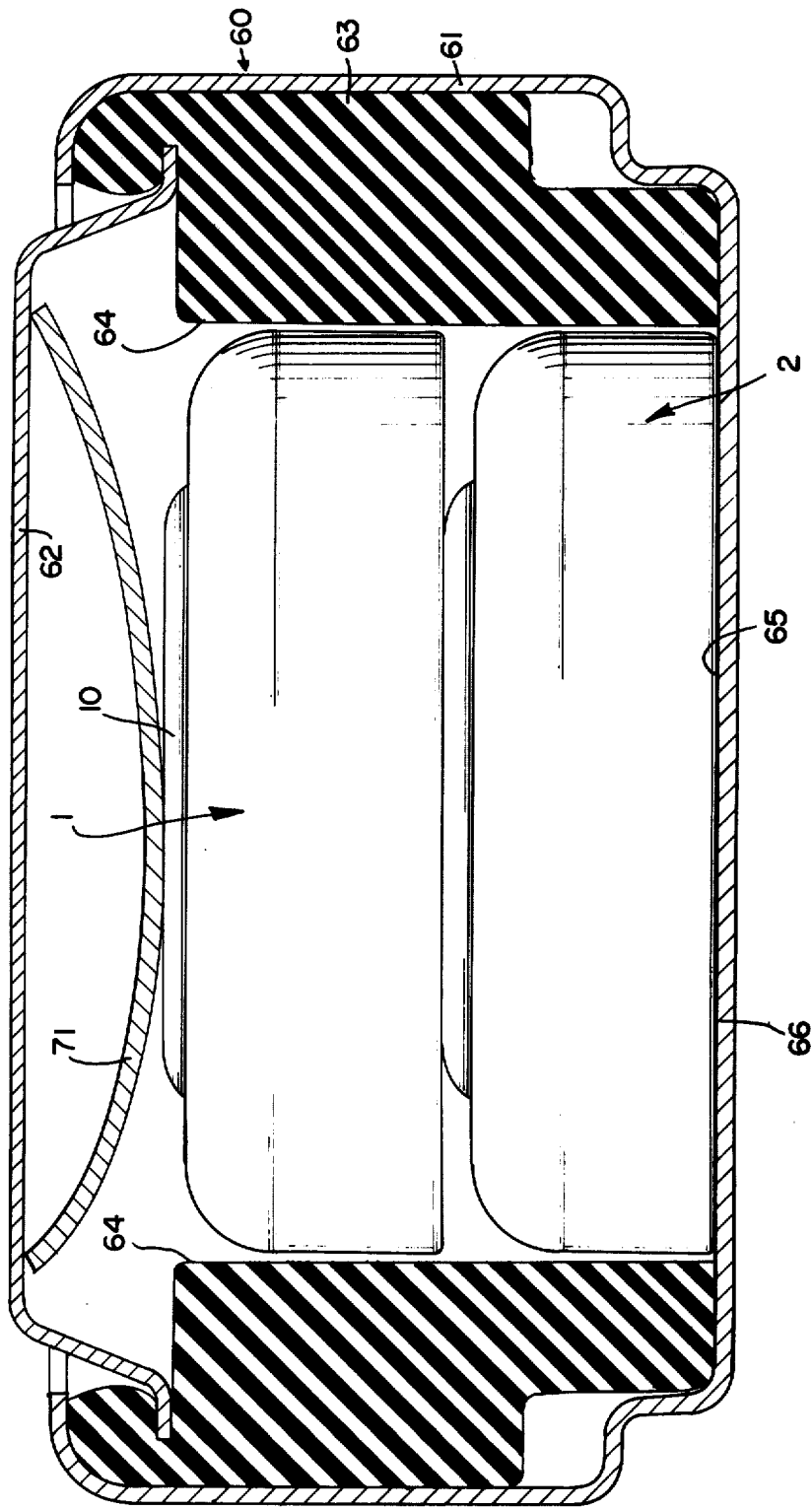

GALVANIC CELL STRUCTURE

FIELD OF THE INVENTION

This invention relates to miniature-sized sealed galvanic button cells, preferably alkaline button cells, encased within an outer liquid-tightly sealed button type housing.

BACKGROUND OF THE INVENTION

Alkaline dry cells comprising an amalgamated zinc anode, a cathode of a depolarizer material including an electrolytically reducible oxygen yielding compound, such as electrolytically reducible oxides and permanganates, and an alkaline electrolyte such as an aqueous solution of an alkali metal hydroxide are usually encased in an airtight housing comprising a main portion or container which accommodates the electrolyte and a second portion or cover. The connection between the container and the cover should be made by interposing an insulating material therebetween to maintain electrical integrity of each part while simultaneously being sufficient to provide an airtight housing for the cell. Thus the former requirement allows the components of the housing to be used as the electrical contacts for the cell while the latter requirement will prevent leakage of the strongly corrosive alkaline electrolyte from the cell thereby preventing the contact of such electrolyte with the atmosphere which would cause the absorption of carbon dioxide therefrom with subsequent progressive conversion of the alkali metal hydroxide into an alkali metal carbonate. Although under normal conditions gas is not generated in the cell when stored on a shelf or during actual use, impurities in the cell material may give rise to gas generation which could substantially increase the internal pressure of the cell. Also gassing in a cell could occur when short circuited, overdischarged, charged, or exposed to excessively high temperature. This gassing could result in a bulge being formed in the bottom of the cell and/or could result in leakage at the sealed area between the container and the cover.

In order to insure satisfactory sealing action in button-type cells, it is common practice in the prior art to interpose a ring of synthetic insulating material between the cover and container forming the housing of the cell prior to applying a deforming pressure at the top edge of the can to produce an airtight seal for the housing. This air-tight seal can be provided by axial-crimping and/or radial-crimping techniques, with the radial crimping technique being preferable. The insulating ring may be coated with a layer of asphalt, wax or some similar sealant material, and a similar type layer may be applied to the inner top edge of the container which is to be engaged by the cover, prior to the application of pressure for producing an airtight seal between the container and cover. Although this type seal proved somewhat effective, it was found that in some instances leakage of electrolyte did occur between the container and/or cover and sealing ring. This could possibly be due to the fact that there exist two paths along which the electrolyte can escape, namely, between the ring and the cover, and/or between the ring and the container.

Another attempt to eliminate the problem of external leakage and salting is to provide a metal bottom container for a cell such that a void space is created between the wall of the cell and the inner wall of the bottom container so that any leakage from the cell can be accommodated in the void space while gas can pass through a vent hole suitably disposed in the outer bottom container. This type cell construction is difficult to fabricate since it has to provide a space for accommodating any liquid or solid leakage materials from the cell while also providing venting means for releasing gas to the atmosphere.

With the advent of many miniature battery-operated devices such as watches, hearing aids, cameras and the like, the leakage and/or salting of miniature cells presents not only a problem due to loss of power in the cell to operate the devices, but also a problem to the devices in which they are used since such leakage and/or salting materials are highly corrosive and could therefore damage components of the devices. Another problem with the advent of a variety of battery-operated devices is that several sizes of miniature cells are required for such devices since each device is usually constructed to accommodate only a specific size cell. Consequently, a particular size cell having the power requirements to operate a particular device may not be used with that device because of its physical size. Thus a miniature button-type cell having an outside diameter of 0.600 inch and height of 0.180 inch could not be used in a device designed to accommodate a button-type cell (size 825) having an outside diameter of 0.850 inch and height of 0.220 inch even though it has sufficient power to operate such device and even though it was observed that the leakage was less in the smaller size button cell.

It is one object of the present invention to encase a miniature-sized galvanic button cell in a liquid-tightly sealed outer housing so that it can accommodate and power devices designed for larger type galvanic button cells.

It is another object of the present invention to encase at least one miniature sealed galvanic button cell in a liquid-tightly sealed metallic outer housing having electrical terminals equivalent to those of a larger sized button cell.

It is another object of this present invention to encase at least one sealed galvanic button cell in a liquid-tightly sealed metallic housing having a cavity to accommodate leakage and/or salting from the encased button cell or cells, and/or a cavity to accommodate any bulging in the encased button cell or cells.

It is another object of the present invention to encase at least one sealed galvanic button cell in a liquid-tightly sealed metallic housing such that said outer housing will act as a restraining member against any bulging occuring in the encased button cell or cells.

Another object of this invention is to encase at least one sealed galvanic button cell in a liquid-tightly sealed metallic outer housing which can be made of a conductive material chosen independently of the electrochemical system of the sealed galvanic button cell.

SUMMARY OF THE INVENTION

The invention relates to a galvanic cell structure comprising at least one miniature sized galvanic button cell, preferably an alkaline button cell, having an anode, a cathode of depolarizer material and an electrolyte assembled in a first sealed button housing which comprises a first conductive container, a first conductive cover for the container, and a first insulating member interposed between the first cover and the upper inner wall of the first container such that a seal, preferably an airtight seal, is formed between said first container and said first cover; said at least one button cell disposed in a second housing which comprises a second conductive container, a second conductive cover for the container, and a second insulating member interposed between the second cover and the upper inner wall of the second container such that a seal, preferably a liquid-tight and/or air-tight seal, is formed between said second container and said second cover; and contact means disposed between at least one of said first button cells and said second button housing for maintaining electrical contact between one of said first containers and said second container and between one of said first covers and said second cover so as to adopt said second cover and said second container as the electrical terminals for said at least one cell enclosed in said second housing.

As used herein, a miniature button cell shall mean a cell comprising an anode, a cathode of depolarizer material and an electrolyte encased in a housing comprised of a shallow conductive cylinder or container, closed at the bottom and open at the top, a conductive cover for said container, and an insulating gasket or grommet interposed between the periphery of said cover and the inner wall of said container adjacent the open end thereof whereupon after the container is crimped against said gasket, a seal, preferably an airtight seal, is produced thereat. The insulated gasket serves to seal the cell while insulating the container from the cover thereby enabling said container and cover to be the terminals for the cells. In miniature button cells the diameter of the container is greater than the height of the cell.

Button cells are presently being produced using various electrochemical systems such as Leclanche, alkaline and acid aqueous, and non-aqueous liquid systems, and solid electrolyte systems. A further description of button cells can be found in U.S. Pat. Nos. 2,458,878; 2,499,239; 2,576,266; 2,620,368; and 3,673,000.

As used herein, a button housing shall comprise a shallow conductive cylinder or container, closed at the one end (bottom) and open at the other end (top), a conductive cover for said container, and an insulating gasket interposed between the periphery of said cover and the wall of said container adjacent the open end thereof whereupon after the container is crimped against said gasket a seal, preferably a liquid tight seal, is produced thereat.

As used herein, an air-tight seal shall mean one that minimizes or substantially eliminates or prevents passage of gases through the sealed area.

As used herein, a liquid-tight seal shall mean one that minimizes or substantially eliminates or prevents passage of liquids through the sealed area.

It has been observed that as the diameter of constant height button cells is increased, the leakage and/or salting of such cells also increases. Although not wanting to be bound by theory, it is believed that the increase in cell leakage and/or salting of larger diameter-size button cells could be due to the fact that the metal stress at the seal area of container in the smaller diameter-size button cells is less than the stress in larger diameter-size button cells when the compression pressure of the gasket material against the container in each size cell is assumed to be the same. Stress is defined approximately as $S = K\ Pr/t$, where $P$=compression pressure in Lbs./In.; $r$=radius of cell diameter, $K$=constant, and $t$=metal thickness of container. It has been found from calculations that the stress of a constant height button cell will approximately double if its diameter is doubled assuming the compression pressure from the gasket is equal. Therefore to maintain the same quality seal in both cells, the metal thickness of the larger cell will have to be twice the thickness of that in the smaller cell when said smaller cell is one-half the diameter of said larger cell. On the other hand, if the stress is assumed constant for two different diameter size button cells having the same height, then it has been calculated that the larger diameter-size cell will be able to withstand a lesser compression pressure than the smaller diameter-size button cell. The compression pressure of the larger diameter-size button cell over the smaller diameter-size button cell has been calculated to be equal to approximately the ratio of the diameter of the smaller button cell to the diameter of the larger button cell. Since compression pressure bears on the quality of the seal formed between the wall of the container and periphery of the cover, the smaller diameter cell is able to withstand greater compression pressure than the larger diameter cell considering metal thickness and mechanical properties of both metal and gasket materials to be equal.

It can thus be reasoned that larger diameter-size button cells will have a poorer quality seal than smaller-size diameter button cells considering the metal thickness and mechanical properties of both the metal and gasket materials being the same in each cell and consequently the larger size button cells will be more susceptible to leakage and/or salting. U.S. Pat. No. 3,185,595 further supports this contention.

In addition, when a miniature button cell is sealed by radial crimping means, a restraining moment is introduced to the bottom edge of the container which tends to restrict the side wall of the container from reaching the maximum radial squeeze against the insulating gasket seal. Consequently, this restraining moment has an effect on cell sealing in addition to the effect due to the diameter-size of the cell. However, as the cell height increases, this restraining moment becomes less important and the diameter size tends to be the important factor in sealing. Thus all types of miniature button cells having a height to diameter ratio of less than 1.0 can derive the greatest benefit from this invention whereby they can be encased in a sealed, preferably a liquid-tightly sealed, button housing.

In accordance with this invention, the encasing of button cells in a sealed button housing will yield the following benefits:

1. provide a double seal cell structure;
2. any leakage and/or salting will be contained in a cavity or cavities between the button housing and the button cell thereby eliminating external leakage and/or salting that could damage a component of the device being powered by the button cell;
3. contain within a cavity between the button housing and the button cell, or in some cases restrain, any bulging of the encased cell so as to effectively eliminate external bulging thereby negating the problem associated with the removal of a bulged cell from a compartment of a battery-powered device;
4. provide greater flexibility in the selection of the contact materials for the outer housing since the button housing materials can be chosen independently of the electrochemical system of the button cell;

5. provide a means whereby smaller size button cells having good capacity can be utilized to power devices designed to accept only larger size button cell; and 6. provide a means whereby a smaller button cell having good capacity can be standardized for use in various size button housings.

BRIEF DESCRIPTION OF THE DRAWINGS

FIGS. 1-3 are horizontal section views of encased button cells embodying the invention.

FIGS. 6-7 are horizontal section views of an encased double button cell structure embodying the invention.

Referring in detail to FIGS. 1, 4 and 5, there is shown a galvanic button cell 1 encased in a button housing 2 having a shallow cylindrical container 3, a cover 4 and interposed between the upper open end of the inner wall 5 of container 3 and the cover 4 is an insulating gasket or grommet 6. Grommet 6 serves as the separator and insulator between cover 4 and wall 5 of container 3, while sealing the junction therebetween. Grommet 6 can also function as a spacer member and locating cushion for button cell 1 and can be made of the usual seal materials such as nylon, polypropylene, polysulfone, plastics, EVA rubber, polyurethane, and the like. Thus grommet 6 can function as a multifunctional member according to this invention. A pressure spring-tab ring 7 is located above button cell 1 and the inner wall 8 of cover 4. FIG. 4 shows ring 7, in greater detail, having a center tab member 9 deformed so that it can rest against the top cover 10 of button cell 1 by pressure action. The outer peripheral edge 11 of ring 7 is shaped so as to abut against the peripheral edge 12 of cover 4. Ring 7 could be welded or secured by other techniques to cover 4 providing a two piece conductive outer cover assembly with tab member 9 making contact with cover 10 of button cell 1, or it could be positioned in place when assembling button cell 1 within button housing 2. FIG. 5 shows a typical button cell 1 having an anode 12, cathode 13, separator 14, grommet 15, shallow cylindrical container 16 and anode cover 10. Thus from FIGS. 1, 4, and 5 it shows tab member 9 of ring 7 making contact with cover 10 of button cell 1 while the bottom surface 17 of container 16 contacts the inner bottom surface 18 of container 3. Grommet 6 is shown bifurcated at one end with one member 19 insulating cover 4 and ring 7 from container 16 of button cell 1 while the other member 20 is interposed between wall 5 and the outer periphery of cover 4 thereby insulating and separating said cover 4 and container 3. By conventional crimping techniques, the junction between the outer periphery of cover 4 and the container 3 can be sealed using grommet 6. In the assembled form as shown in FIG. 1, the anode cover 10 is electrically connected to cover 4 while button cell container 16 is electrically connected to container 3 so that cover 4 and container 3 become the new terminals for button cell 1. Cavity 21 formed between button housing 2 and button cell 1 will accommodate any leakage and/or salting from button cell 1 thereby providing a button housing free of external signs of such leakage and/or salting. Since the bottom surface 17 of button cell 1 abuts the inner bottom surface 18 of container 3, the latter surface 18 will act as a restraining member against any cell bulging of surface 17. The materials selected for button housing 2 can be the usual cell container materials such as nickel and nickel alloys, steel, nickel coated steel, tin coated steel, and including also such other materials as conductive metals and metal alloys and the like. It is also within the teachings of this invention to have cover 4 and container 3 made of different materials depending on the application where the button cell housing is to be used.

FIG. 2 shows a button cell 1 encased in a button housing 30 composed of a shallow cylindrical container 31, cover 32 and insulating grommet 33. Unlike the assembly shown in FIG. 1, a conductive strip 34 is disposed in touching relationship between the bottom surface 35 of button cell 1 and the inner bottom surface 36 of container 31 making electrical contact therebetween. Another conductive strip 37 is disposed in touching relationship between the top surface of anode cover 10 and the inner top surface 38 of cover 32 making electrical contact therebetween. One end of each strip 34 and 37 is welded to inner surfaces 36 and 38 respectively, of button housing 30, and the opposite end of each strip is welded to container 16 and anode cover 10, respectively of button cell 1. An insulating ring 39 is positioned between button cell 1 and cover 32 so as to electrically isolate cover 32 from container 16 of button cell 1. Again the outer junction of cover 32 is sealed to the inner wall of container 31 via grommet 33 as described in conjunction with FIG. 1. Cavity 40 is provided to accommodate any leakage and/or salting from button cell 1 while disc 34 acts to further restrain any bulging in the bottom surface 35 of button cell 1. In this embodiment, the welded conductive strips provide the contact means to maintain electrical contact between cover 10 and cover 32 and between container 16 and container 31. Grommet 33 also functions as a spacer member and locating cushion for button cell 1. Although strips 34 and 37 are shown as single flat stripe it may be preferable to replace such strips with foldable strips so as to facilitate the welding operation required for this type of construction. Also the strips 34 and 37 of this embodiment may be replaced with deformed resilient conductive strips thereby eliminating the necessity of the welding operation since said resilient strips will provide the necessary electrical contact between the button cell and the button housing. However, in some applications it may be preferable to use a combination of the deformed-strip concept in conjunction with the welded-strip concept, so that said deformed strips are welded to the cell and button housing as disclosed in conjunction with FIG. 2.

FIG. 3 shows a spring contact embodiment having the same numbered elements as in FIG. 2 except welded strips 34 and 37 are replaced by a single depressed conductive wave spring washer 41. By using this embodiment, cavity 42 is formed between bottom surface 35 of button cell 1 and inner bottom surface 36 of container 31. This cavity 42 will accommodate any bulging of surface 35 thus maintaining the button housing free of external signs of any such bulging. The electrical contact between cover 10 and cover 32 and between container 16 and container 31 is maintained by the conductive wave spring washer 41.

FIG. 6 shows a button housing 60 comprising a shallow container 61, cover 62 and grommet 63. Series connected button cells 1 and 2 are disposed within container 61 and positioned and cushioned therein by the vertical internal wall 64 of grommet 63. A partially depressed conductive wave spring washer 70 is disposed between the inner bottom wall 65 of container 61 and the bottom surface 66 of cell 2. Insulating rings 67 and 68 are interposed between button cells 1 and 2 and between button cell 1 and conductive disc 69, respectively, so as to prevent shorting between cells 1 and 2 and the cover 62 and container 61 of button housing 60. Wave spring washer 70 in addition to supplying contact pressure for maintaining electrical continuity for button cells 1 and 2, will be able to effectively and substantially absorb any bulging in button cells 1 and 2 without substantially distorting the bottom surface 65 of container 61. Conductive disc 69 can vary in thickness depending on the desired overall size of the button housing 60. Thus by varying the thickness of conductive disc 69, the height of button housing 60 can be controlled.

FIG. 7 shows a somewhat similar embodiment having the same numbered elements as in FIG. 6 except the wave spring washer 70, conductive disc 69 and insulating rings 67 and 68 are replaced by an arched conductive resilient strip 71. This strip 71 provides the pressure contact means for maintaining electrical continuity between the button cells 1 and 2 and button housing 60 while also electrically connecting the cover 10 of button cell 1 to cover 62 of button housing 60. In this embodiment the button cells are axially disposed one on the other and positioned in container 61 without the use of any insulating members except for grommet 63. Any bulging in either button cell can be absorbed by the arched strip 71 thereby concealing any such bulging from external appearance. Also any leakage and/or salting from either cell will be confined to the spacing between button cells 1 and 2 and the internal surface of button housing 60.

FIG. 8 shows a cutaway horizontal section view of a button cell 1 disposed within a button housing 80 composed of a shallow cylindrical container 81, cover 82 and insulating grommet 83. A conductive resilient ring 84 has a cross-section resembling an inverted U-shape with the top of interior leg member 86 extending radially inward and thus being vertically shorter than exterior straight leg member 87. Leg member 87 may be secured to the bottom surface 85 of container 81 by welding or some similar technique, with leg member 86 disposed substantially parallel to said surface 85. The right angle formed by the extended leg member 86 acts to position and support button cell 1 and provides a cavity 88 which can accommodate any bulging in said cell 1. With conductive ring 84 being resilient, it can exert pressure against button cell 1 thereby maintaining the anode cover 10 and container 16 in electrical contact with cover 82 and container 81, respectively.

FIG. 9 shows a somewhat similar embodiment having the same numbered elements as in FIG. 8 except conductive ring 86 is replaced with a conductive resilient retaining ring 90. Retaining ring 90 consist of a vertical segment 91 having radially extending outward from its top a substantially horizontal segment 92 and radially extending inward from its bottom a substantially horizontal segment 93. Segment 92 may be secured to the inner side wall of container 81 by spot welding or some similar technique. The right angle formed by segments 91 and 93 acts as a positioner and support member for button cell 1 and provides a cavity 88 which can accommodate any bulging in said cell 1. With conductive retaining ring 90 being resilient, it can exert pressure against button cell 1 thereby maintaining the anode cover 10 and container 16 in electrical contact with cover 82 and container 81, respectively.

Figure 3:
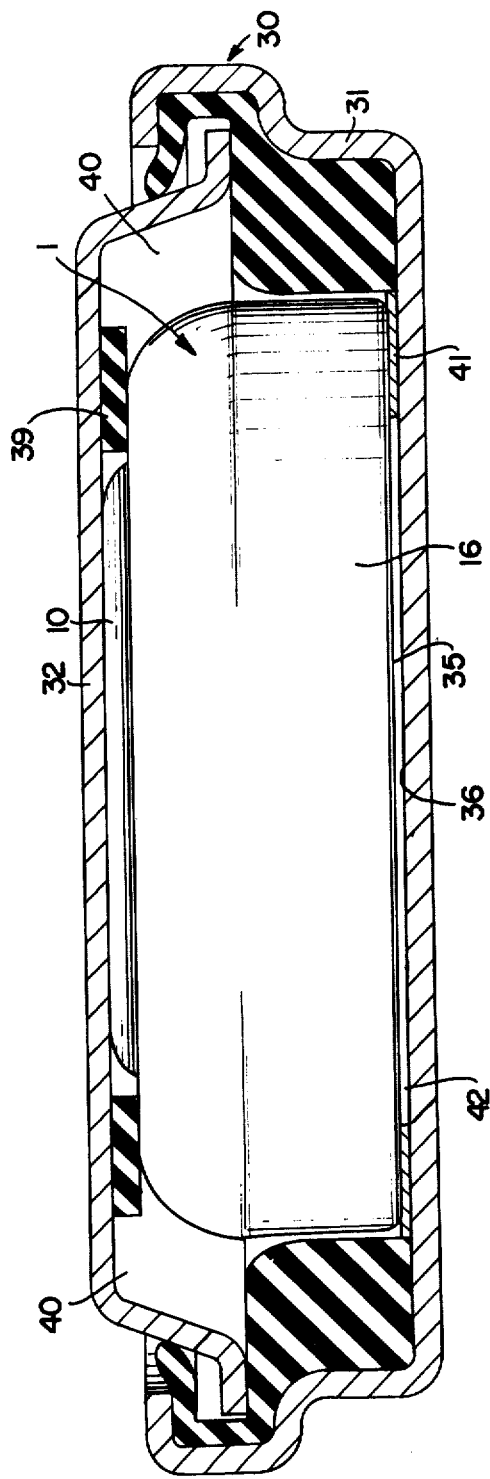
Figure 4:
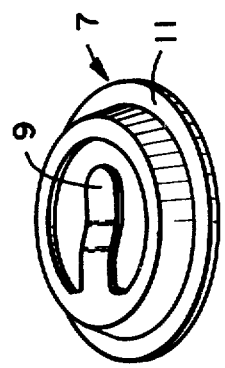
FIG. 4 shows an isometric view of a pressure spring-tab ring used in the embodiment of FIG. 1.
Figure 9:
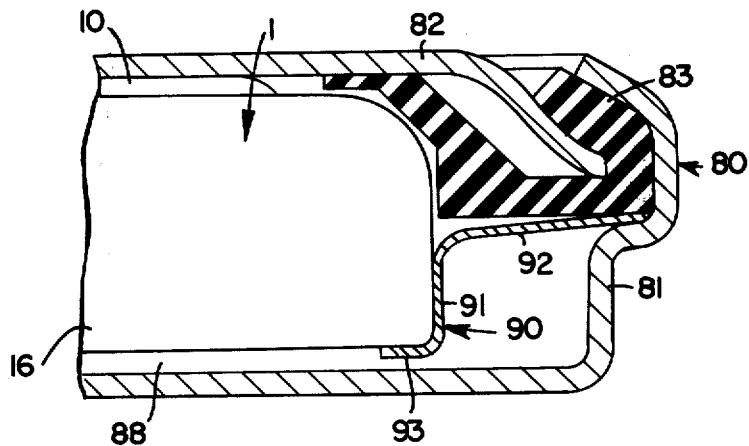
FIGS. 8-9 are partial horizontal section views of encased button cells embodying the invention.
Figure 8:
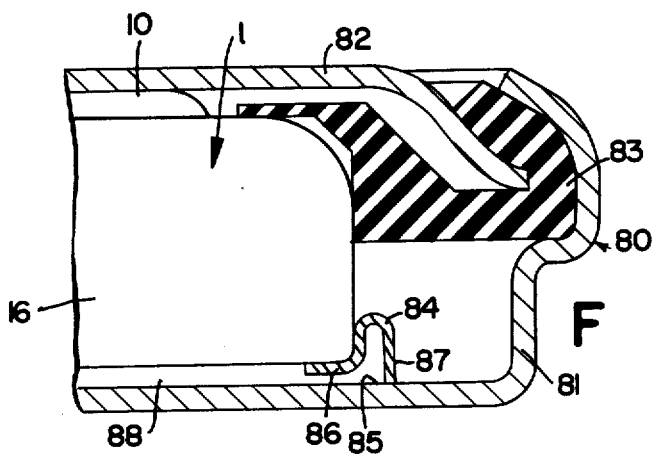
Figure 5:
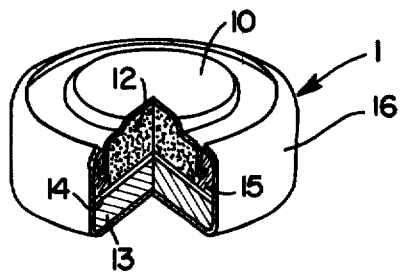
FIG. 5 is a cutaway isometric view of a miniature button alkaline cell.
Figure 6:
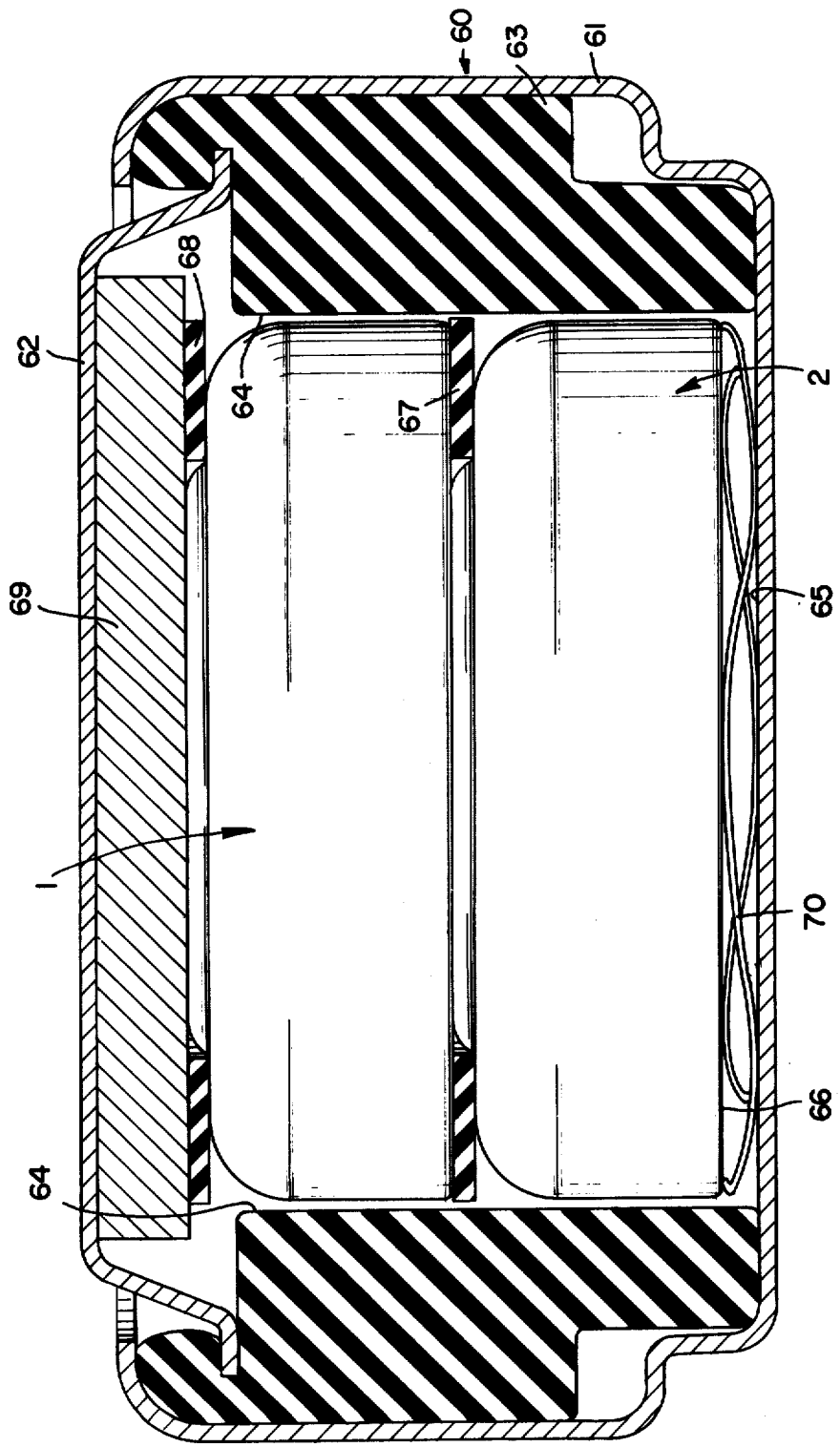

While the invention has been described in conjunction with the specific embodiments shown in the drawings, it is obvious that certain modifications may be made to the invention without deviating from the scope of the invention. For example, one or more features of one embodiment may be added to one of the other embodiments, or the location of one feature in one embodiment may be changed in that embodiment or in another embodiment, i.e., the wave spring washer shown in FIG. 6 may be positioned between the cover of the housing and the cover of the button cell or the arched strip shown in FIG. 7 may be positioned between the bottom surface of the container for the button cell and the inner bottom surface of the container for the button housing, or the resilient wave spring washer of FIG. 6 may be disposed between the bottom surface of button cell 1 and the inner bottom surface of container 3 as shown in FIG. 1 so as to provide an additional pressure contact means for the cell structure.

What is claimed is:

1. A galvanic cell structure comprising at least one miniature sized galvanic button cell having an anode, a cathode of depolarizer material and an electrolyte assembled in a first sealed button housing which comprises a first conductive container, a first conductive cover for the container, and a first insulating member interposed between the first cover and the upper inner wall of the first container such that a seal is formed between said first container and said first cover; said at least one button cell disposed in a second housing which comprises a second conductive container, a second conductive cover for the container, and a second insulating member interposed between the second cover and the upper inner wall of the second container such that a seal is formed between said second container and said second cover; and contact means disposed between at least one of said first button cells and said second button housing for maintaining electrical contact between one of said first containers and said second container, and between one of said first covers and said second cover so as to adopt said second cover and said second container as the electrical terminals for said at least one cell enclosed in said second housing.

2. The galvanic cell structure of claim 1 wherein one button cell is encased in the second housing.

3. The galvanic cell structure of claim 1 wherein two series connected button cells are encased in the second housing.

4. The galvanic cell structure of claim 1 wherein said galvanic button cell is an alkaline button cell.

5. The galvanic cell structure of claim 1 wherein said second housing has a liquid-tight seal.

6. The galvanic cell structure of claim 1 wherein said second insulating member provides a spacer and cushioning means for said at least one galvanic button cell encased in the second housing.

7. The galvanic cell structure of claim 2 wherein a conductive ring having a center deformed tab is disposed in touching relationship between the inner bottom wall of the second cover and the top cover of the button cell such that the tab exerts pressure contact against the top cover of the button cell thereby electrically connecting said top cover to said second cover.

8. The galvanic cell structure of claim 7 wherein a resilient conductive wave spring washer is disposed between the bottom surface of the button cell and the inner bottom surface of the second housing.

9. The galvanic cell structure of claim 1 having at least one cavity formed between the button cell and the second housing for accommodating any leakage and/or salting from said button cell.

10. The galvanic cell structure of claim 1 having a cavity formed between the outer bottom surface of the button cell and the internal bottom surface of said second container for accommodating any bulging that said button cell may develop.

11. The galvanic cell structure of claim 1 wherein a resilient conductive wave spring washer is disposed in touching relationship between the button cell and the second housing, said spring washer supplying pressure means for maintaining electrical continuity between the second housing and the button cell, and providing means for substantially absorbing any bulging that said button cell may develop.

12. The galvanic cell structure of claim 1 wherein at least one arched resilient conductive strip is disposed in touching relationship between the button cell and the second housing, said strip supplying pressure contact means for maintaining electrical continuity between the second housing and the button cell, and providing means for substantially absorbing any bulging that said button cell may develop.

13. The galvanic cell structure of claim 1 wherein a conductive distorted resilient ring is disposed in touching relationship between the outer bottom surface of the button cell and the internal bottom surface of said second container, said ring providing a seat for the button cell while simultaneously providing pressure contact means for maintaining electrical continuity between the second housing and the button cell and providing means for substantially absorbing any bulging that said button cell may develop.

14. The galvanic cell structure of claim 1 wherein at least one conductive strip is welded at one end to the button cell and at the other end to the second housing.

* * * * *